O. REICHE.
FOUR WHEEL DRIVE MECHANISM.
APPLICATION FILED AUG. 31, 1917.
1,262,562.
Patented Apr. 9, 1918.
3 SHEETS—SHEET 2.
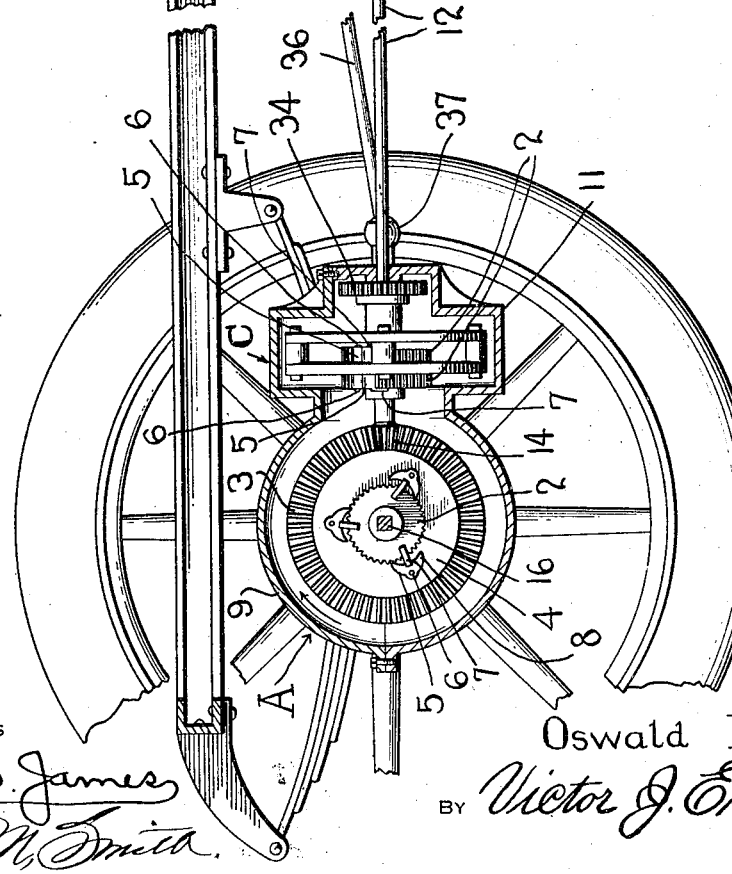
INVENTOR
Oswald Reiche O. REICHE.
FOUR WHEEL DRIVE MECHANISM.
APPLICATION FILED AUG. 31, 1917.
1,262,562.
Patented Apr. 9, 1918.
3 SHEETS—SHEET 3.
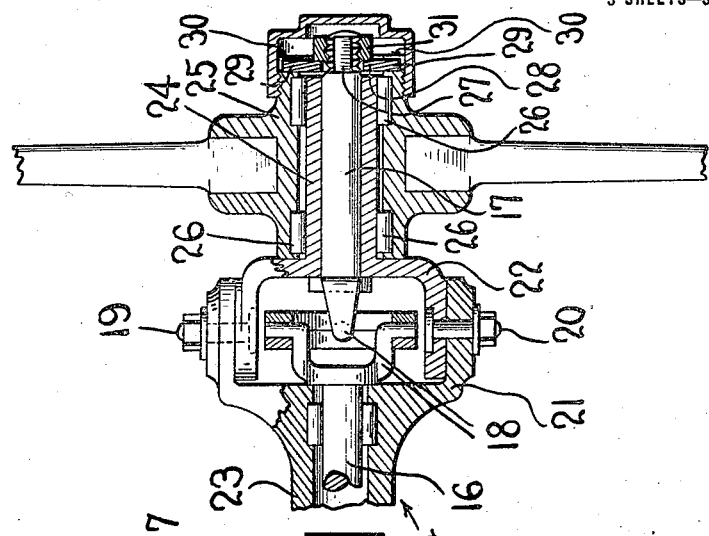
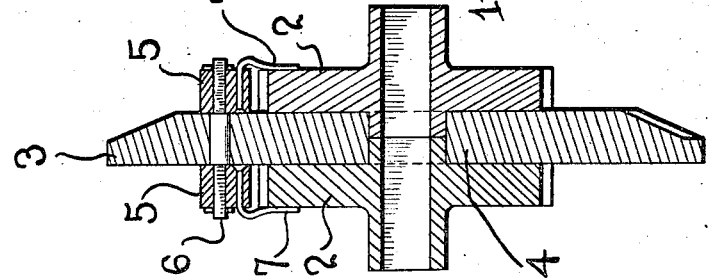
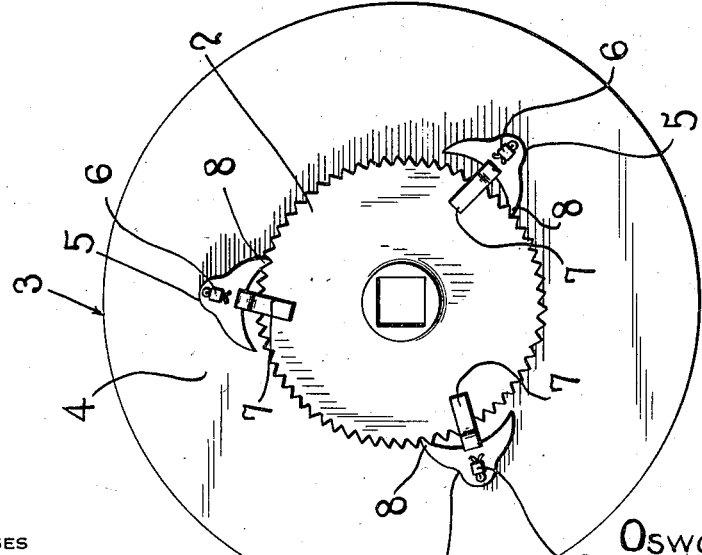
WITNESSES
L. B. James
R. M. Smith
INVENTOR
Oswald Reiche
BY Victor J. Evans
ATTORNEY

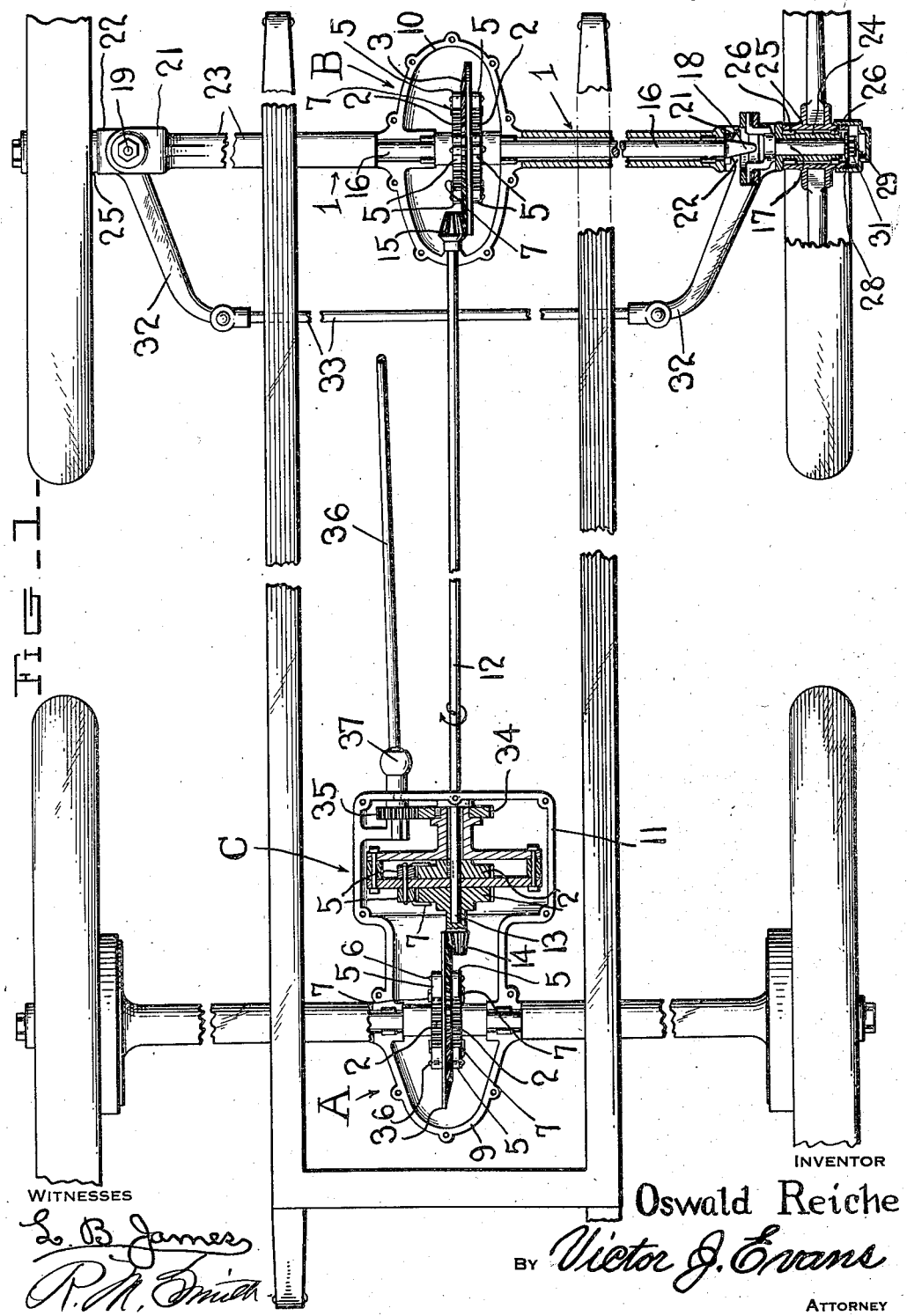

UNITED STATES PATENT OFFICE.

OSWALD REICHE, OF ROLF, NEBRASKA.

FOUR-WHEEL DRIVE MECHANISM.

1,262,562.          Specification of Letters Patent.      Patented Apr. 9, 1918.

Application filed August 31, 1917. Serial No. 189,208.

*To all whom it may concern:*

Be it known that I, OSWALD REICHE, a citizen of the United States, residing at Rolf, in the county of Cherry and State of Nebraska, have invented new and useful Improvements in Four-Wheel Drive Mechanisms, of which the following is a specification.

This invention relates to four wheel drive mechanism and the object thereof is to provide a novel form and arrangement of power transmitting mechanism whereby the power of an engine may be transmitted to and distributed upon all four wheels of a motor vehicle, enabling better traction to be obtained, preventing skidding of the machine, increasing the ability of the machine to climb steep grades, and also distributing the strain and wear throughout the driving mechanism.

With the above and other objects in view, the invention consists in the novel construction, combination and arrangement of parts, herein fully described, illustrated and claimed.

In the accompanying drawings:—

Figure 1 is a plan view partly in section of the chassis of a motor vehicle illustrating the improved driving mechanism.

Fig. 2 is a vertical longitudinal section through the same.

Fig. 3 is an enlarged sectional view of the differential gearing taken at right angles to the shaft upon which it is mounted.

Fig. 4 is also a sectional view of the differential gearing taken at a right angle to Fig. 3.

Fig. 5 is an enlarged sectional view of one of the steering knuckles and the adjacent wheel hub, taken longitudinally of the knuckle spindle which is shown in elevation.

The improved driving mechanism contemplated in this invention, comprises three sets of differential gearing, A designating generally the rear axle differential gearing, B the front axle differential gearing and C the intermediate differential gearing. As each of said differential gearings embodies the same principle and elements, a description of one will answer for all.

Each differential gearing embodies in connection with the divided axle or shaft sections, a pair of spur gears 2 each of which is mounted on the respective axle section 1. 3 designates a master gear or as it is sometimes termed a ring gear, the body or web 4 of which is interposed between the gears 2. Connected pivotally to the opposite sides of the body 4 of the master gear is a circular series of double ended dogs 5, each dog being mounted on a pivot 6 carried by the gear 3. Each dog 5 has an inwardly extending friction tongue 7 which overlaps the marginal portion of the adjacent gear 2 so that a movement of said gear in either direction will produce a tilting or rocking movement of the dog 5, causing one engaging point 8 thereof to coöperate with the teeth of the gear 2 while the other engaging point of the dog is moved away from the teeth of the gear 2. While I have shown three dogs 5 for each gear 2, it will of course be understood that the number of dogs may be increased or decreased as deemed expedient or necessary. It will be understood of course that in each differential gearing, the gear 3 is the driving element and as it carries the dogs 5, the friction tongues 7 will be retarded by the gears 2 thereby tilting the dogs until they engage the teeth of said gears 2. Where one of the shaft sections 1 is forced to turn at a slower rate of speed than the other, the dogs 5 which coöperate with the gear 2 on the faster moving axle section will be rocked out of engagement thereby leaving such axle section free temporarily. The differential gearing is also of such a nature that it allows for reversing the direction of travel of the vehicle, the same operation taking place whether the machine is backing or proceeding in a forward direction. The differential gearings A and B provide for a different ratio of speed for the two wheels associated therewith, while the differential gearing C provides for a different ratio of speed for the front and rear axles. This insures a proper distribution of power to all four of the wheels, all of which become driving wheels. The gearings A and B are inclosed within the usual housings 9 and 10 and the gearing C is also inclosed in a housing 11 which may constitute an extension or part of the housing 9, as shown. 12 designates a fore and aft shaft which connects the differential gearings B and C. A short section 13 of the shaft 12 connects the differential gearings A and C. The shaft 12 as a whole is connected to the master gears of the differential gearings A and B by means of bevel pinions 14 and 15.

Referring now to the front driving axle, each of the sections 1 thereof comprises a main section 16 and a spindle section 17, said sections being connected by a tumbling or universal joint 18 in vertical alinement with upper and lower pivot bolts 19 and 20 which connect yoke or fork members 21 and 22, the member 21 being fixedly connected to or formed integrally with the outer end of the non-rotary axle housing 23, and the outer yoke or fork member 22 having an outwardly extending tubular bearing portion 24 upon which the hub 25 of the wheel is journaled, anti-friction rollers 26 being interposed between the members 24 and 25. The spindle section 17 of the front axle is formed with opposite flat sides 27 to engage a key 28 having an opening therein of the same shape as the spindle in cross section, and having diametrically opposite wings 29 which are received in diametrically opposite notches 30 in the wheel hub. A nut 31 is threaded upon the outer end of the spindle and bears against the key just described, holding the same in engagement with the hub. This locks the wheel to the spindle beyond the tubular bearing member 24.

It will be understood that both of the steering wheels and knuckles embody the same construction hereinabove described and each of the yoke members 22 is provided with an offstanding arm 32, both arms being coupled together by the usual connecting rod 33 forming a member of the steering mechanism.

Motion is transmitted primarily to the driving shaft 12 which, for that purpose, has fast thereon a spur gear 34 which meshes with and is driven by a similar gear 35 fast on a tumbling shaft 36 having incorporated therein a universal joint 37. The shaft 36 extends forwardly from the differential gearing C and is coupled by the usual means to the engine shaft.

From the foregoing description taken in connection with the accompanying drawings it will now be understood that the improved transmission gearing provides for an equal distribution of the power of the engine to all four of the wheels of the vehicle without interfering in the slightest degree with the steering movement of the front wheels and the steering mechanism used in conjunction therewith. The power of the engine is first transmitted to the shaft which extends fore and aft and occupies the position occupied by what is ordinarily known as the drive shaft. The power is then transmitted from said drive shaft to the front and rear driving axles and by the sections thereof to the driving wheels. Under the arrangement of this invention, two or more dogs 5 are mounted frictionally upon their pivots while the remaining dog or dogs may be mounted loosely, this being done in order that one of the dogs will be sure to engage the gear 2 with which it coöperates while the other dog or dogs may be rocked out of engagement with the gears 2 with which they coöperate.

I claim:—

1. In differential gearing, the combination of two shaft sections, gears fast on the adjacent inner ends of said shaft sections, a master gear interposed between said gears and normally loose in relation thereto and to the shaft sections, and dogs carried by said master gear and pivotally mounted on the opposite sides thereof, each of said dogs comprising two gear engaging points located equi-distantly from the pivot point of the dog, and each dog further having a friction tongue in constant engagement with a side face of the respective gear.

2. In differential gearing, the combination of two shaft sections, gears fast on the adjacent inner ends of said shaft sections, a master gear interposed between said gears and normally loose in relation thereto and to the shaft sections, and dogs carried by said master gear and pivotally mounted on the opposite sides thereof, each of said dogs comprising two gear engaging points located equi-distantly from the pivot point of the dog, and adapted to positively engage the respective gear, and also having means frictionally engaged by said gear to cause a rocking and reversing movement to be imparted to the dog when the direction of rotation of the master gear is reversed.

In testimony whereof I affix my signature.

OSWALD REICHE.